Dec. 6, 1949    W. H. SILVER    2,490,237
TOOL CLAMP
Filed Nov. 29, 1945
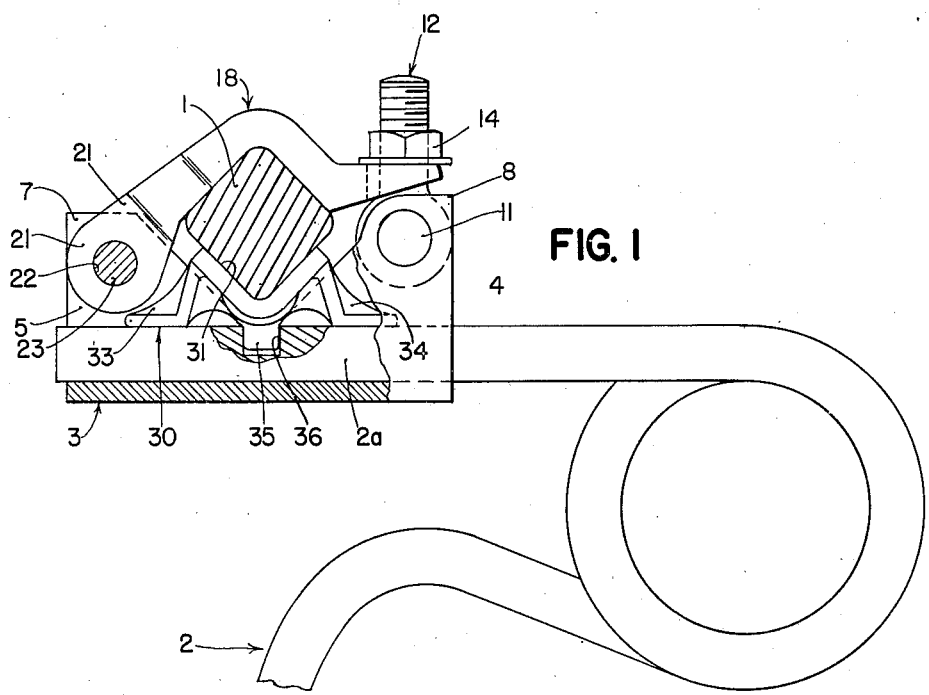
FIG. 1
FIG. 4
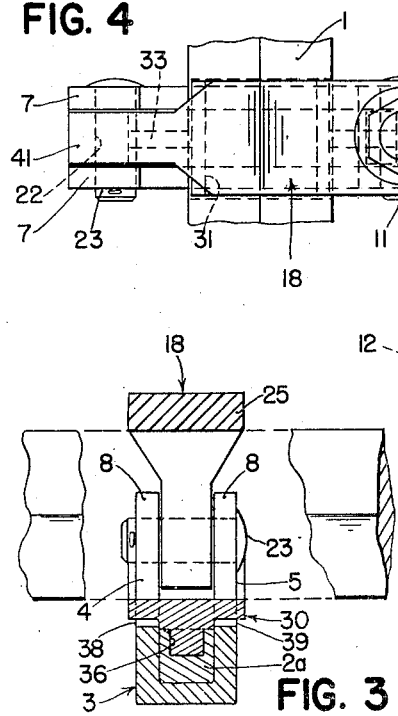
FIG. 2
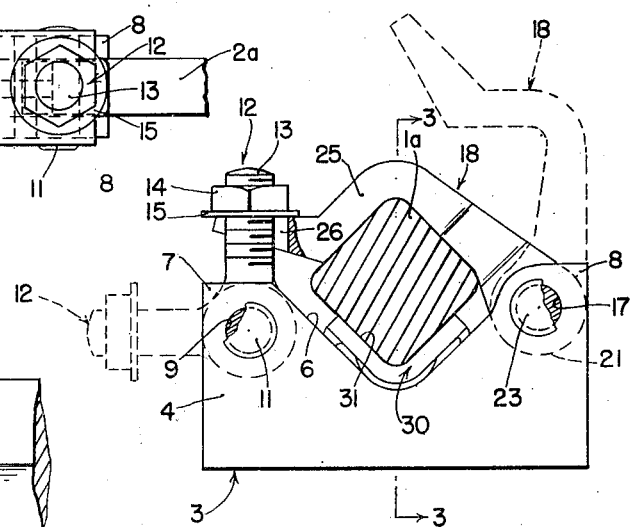
FIG. 3
*INVENTOR.*
WALTER H. SILVER
BY 
*ATTORNEYS.*

Patented Dec. 6, 1949

2,490,237

UNITED STATES PATENT OFFICE 2,490,237

TOOL CLAMP

Walter H. Silver, Moline, Ill., assignor to Deere & Company, Moline, Ill., a corporation of Illinois Application November 29, 1945, Serial No. 631,715

3 Claims. (Cl. 287—54)

The present invention relates generally to agricultural implements and more particularly to soil working implements in which tools are removably or detachably connected with a supporting structure.

The object and general nature of the present invention is the provision of an agricultural implement in which new and improved tool clamping means is provided. Further, it is an important feature of this invention to provide a tool clamp adapted to secure a tool to a support in the form of a transverse bar, and an additional feature of this invention is the provision of a tool clamp having wide application to different kinds and sizes of supporting tool bars.

Another feature of this invention is the provision of a tool clamp in which the tool may easily and quickly be attached or removed, the construction being such that it is unnecessary to detach or entirely disconnect any of the clamping or tool parts, all parts of the tool clamp being connected together so that there is little likelihood of any of the parts becoming lost or misplaced.

These and other objects and advantages of the present invention will be apparent to those skilled in the art after a consideration of the following detailed description, taken in conjunction with the accompanying drawings, in which Figure 1 is a side view, with certain parts being broken away, of a tool clamp constructed according to the principles of the present invention.

Figure 2 is a view similar to Figure 1, showing the tool clamp adapted for a different size of supporting tool bar.

Figure 3 is a sectional view taken generally along the line 3—3 of Figure 2.

Figure 4 is a plan view of the clamping structure shown in Figure 1.

Referring now to the drawings, the reference numeral 1 indicates the transverse supporting bar of a tool bar cultivator, such as the one shown in my United States Patent 2,385,950, issued October 3, 1945, or some other similar implement. The tool bar 1 serves as a support for a plurality of earth working tools, such as a spring tooth cultivator element 2 which includes a generally longitudinally extending section 3 adapted to receive clamping means by which it may be connected to the tool-supporting bar 1.

The clamping means of the present invention comprises a clamping plate 3 constructed as a U-shaped member of flat plate stock having side sections 4 and 5, each with a centrally arranged generally V-shaped notch 6 and fastener-receiving extensions 7 and 8, the latter being somewhat higher than the extension 7. The extensions 7 are apertured, as at 9 (Figure 2), and when the parts are arranged as in Figure 2 to receive a large tool bar 1a, a pin 11 is disposed in the apertures 9 and receives an eyebolt 12 swingably mounted thereon. The threaded section 13 of the eyebolt receives a nut 14 and washer 15. The opposite extensions 8, which extend above the extensions 7 are apertured, as at 17, to receive a swingable clamp lock 18. The latter member includes an end 21 which is apertured, as at 22, to receive one of the pivot bolts, 11 or 23, the pivot bolt 23 being disposed in the apertures 17 in the plate extensions 8. The central portion of the clamp lock is of inverted V-shaped configuration, as shown at 25, the end thereof being bifurcated, as shown at 26 (Figure 2), to receive the upper end 13 of the eyebolt 12. When the clamp is to be arranged to receive a smaller tool bar 1, the eyebolt 12 is swingably connected with the higher extensions 8, as by having its pivot bolt 11 disposed in the apertures 17, and the clamp lock 18 is swingably mounted on its pivot pin 23 disposed in the openings 9 in the lower extensions 7. It is to be understood, of course, that the eyebolt 12 and clamp lock 18 might be reversed without reversing the pins 11 and 23.

A clamp block, indicated in its entirety by the reference numeral 30, is disposed within the lower portion of the clamp plate 3 and includes a generally upwardly facing V-shaped saddle section 31 which receives the lower side of the bar 1. The member 30 is formed with fore and aft extending sections 33 and 34 which extend fore and aft a distance sufficient to bring the sections 33 and 34 generally underneath the pins 11 and 23. The central part of the member 30 on the underside thereof has a lug 35 formed thereon. The lug 35 is adapted to extend into a locking recess 36 formed on the tool section 2a.

As best shown in Figure 3, the sides of the clamp block 30 overhang but are spaced slightly from the notched sections 6, as indicated at 38 and 39 in Figure 3.

In use, the clamp parts are arranged as shown in Figure 1 when the tool 2 is to be secured to one of the smaller sizes of tool bars 1. In this case, the hinge pin 23 is placed in the lower openings 9 of the clamp block and the eyebolt and its pin 11 placed in the higher pair of openings 17. When the tool is to be secured to one of the larger tool bars, as the tool bar 1a in Figure 2, the clamp lock member 18 and the bolts are reversed, the hinge pin 23 being placed in the pair of openings 17, thus disposing the clamp lock 18 in a higher position relative to the clamping plate 3 as shown in Figure 1, the pin 11 for the eyebolt 12 being mounted in the lower openings 9. By virtue of the clearance shown at 38 and 39 (Figure 3) when the nut 14 on the eyebolt 12 is tightened to clamp the clamp lock 18 down against the tool bar, the tool bar is held firmly against the clamp block 30 and the latter, in turn, is forced down against the tool extension 2a, holding the latter firmly in the bottom of the clamp plate 3, as shown in Figure 1. The lug 35 is held in the recess 36 receiving it, and hence not only is the tool held firmly and rigidly in the clamp plate 3 but, additionally, fore and aft stresses are transmitted through the lug 35 to the clamp block 30 and thence to the tool bar 1 (or 1a). The tool 2 may be shifted laterally along the tool bar merely by loosening the one nut 14, and if the tool 2 is to be taken off, all that it is necessary to do is to loosen the eyebolt sufficiently to permit its being swung down into the dotted line position shown in Figure 2, whereupon the clamp lock 18 may be swung upwardly on the pin 23 thus freeing the tool and clamp from the tool bar. However, the clamp block 30 cannot become detached because the extensions 33 and 34 lie under the eye of the eyebolt 12 and the hinge end 41 of the clamp lock 18. It is, of course, easy to replace the clamp block 30 merely by taking out either of the pins 11 and 23 to permit the withdrawal of the member 30 from the clamp plate 3.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A clamp for clamping a tool to a tool bar, the latter being of polygonal cross section, said clamp comprising a U-shaped plate member adapted to receive said tool in the bottom thereof and having sides notched above the bottom to receive said tool bar, an outer clamping part having one end pivoted to said plate member at one side of said notch, said part being adapted to extend across said tool bar, means for fastening the other end of said part to said plate member at the other side of said notch, and a clamp block disposed between the sides of said plate member and adapted to lie between the tool and tool bar, said clamp block having extensions lying underneath said one end of said clamping part and underneath said fastening means for retaining said clamp block in said plate member when said outer clamping part is loosened.

2. A clamp for clamping a tool to a tool bar, the latter being of polygonal cross section, said clamp comprising a U-shaped plate member adapted to receive said tool in the bottom thereof and having sides notched above the bottom to receive said tool bar, an outer clamping part having one end pivoted to said plate member between the sides thereof at one end of said plate member, said part being adapted to extend across said tool bar, means lying between the sides of said plate member at the other end for fastening the other end of said part to said plate member so as to clamp a tool bar in said notches, a clamp block disposed between the sides of said plate member and adapted to lie between the tool and tool bar in the lower portion of the plate member, said clamp block having extensions lying underneath said one end of said clamping part and underneath said fastening means for retaining said clamp block in said plate member when said outer clamping part is loosened to release said tool bar, and interengaging portions on said tool and said clamp part for holding said tool in said plate member when said outer clamping part is loosened.

3. A clamp for clamping a tool to a tool bar, the latter being of polygonal cross section, said clamp comprising a U-shaped plate member having upwardly extending sides and a closed bottom, said U-shaped member being adapted to receive said tool in the bottom thereof and said sides being notched above the bottom to receive the tool bar, the outer portions of said sides extending upwardly and apertured to form two pairs of apertured ears, the apertures of each pair being aligned transversely of said U-shaped member and said tool bar, an outer clamping part, means including a transverse pivot carried by one pair of apertured ears and pivotally connecting one end of said outer clamping part to said plate member at one side of said notches, said part being adapted to extend across said tool bar, means including a second transverse pivot carried by the other pair of apertured ears for connecting the other end of said part with said plate member at the other side of said notches, and a clamp block disposed between the sides of said plate member and adapted to lie between the tool and tool bar, said clamp block having extensions lying underneath said transverse pivot means and acting thereagainst for retaining said clamp block in said plate member when said outer clamping part is loosened.

WALTER H. SILVER.

REFERENCES CITED

The following references are of record in the file of this patent:

UNITED STATES PATENTS

| Number | Name | Date |
|---|---|---|
| 323,705 | Maunder | Aug. 4, 1885 |
| 413,498 | Downward | Oct. 22, 1889 |
| 1,435,092 | Thomas | Nov. 7, 1922 |
| 1,925,699 | Marshall | Sept. 5, 1933 |
| 2,259,890 | Hipple | Oct. 21, 1941 |
| 2,280,509 | Cheron | Apr. 21, 1942 |
| 2,385,950 | Silver | Oct. 2, 1945 |

FOREIGN PATENTS

| Number | Country | Date |
|---|---|---|
| 549,385 | Great Britain | Nov. 18, 1942 |